United States Patent
Wang

(10) Patent No.: US 10,368,123 B2
(45) Date of Patent: Jul. 30, 2019

(54) INFORMATION PUSHING METHOD, TERMINAL AND SERVER

(71) Applicant: Tencent Technology (Shenzhen) Company Limited, Shenzhen, Guangdong (CN)

(72) Inventor: Jingyao Wang, Guangdong (CN)

(73) Assignee: TENCENT TECHNOLOGY (SHENZHEN) COMPANY LIMITED, Guangding, Shenzhen (CN)

( * ) Notice: Subject to any disclaimer, the term of this patent is extended or adjusted under 35 U.S.C. 154(b) by 0 days.

(21) Appl. No.: 15/247,465

(22) Filed: Aug. 25, 2016

(65) Prior Publication Data
US 2016/0366463 A1 Dec. 15, 2016

Related U.S. Application Data

(63) Continuation of application No. PCT/CN2015/072890, filed on Feb. 12, 2015.

(30) Foreign Application Priority Data

Feb. 26, 2014 (CN) .......................... 2014 1 0066693

(51) Int. Cl.
*H04N 21/435* (2011.01)
*H04N 21/414* (2011.01)
(Continued)

(52) U.S. Cl.
CPC ........... *H04N 21/435* (2013.01); *G06F 16/00* (2019.01); *G06F 16/7837* (2019.01);
(Continued)

(58) Field of Classification Search
CPC ........... H04N 21/435; H04N 21/41407; H04N 21/4316; H04N 21/44008; H04N 21/4722;
(Continued)

(56) References Cited

U.S. PATENT DOCUMENTS 7,620,766 B1 * 11/2009 Waldspurger ....... G06F 12/1018
711/6
2006/0253527 A1 11/2006 Kiljander
(Continued)

FOREIGN PATENT DOCUMENTS

CN 1809999 A 7/2006
CN 101216833 A 7/2008
(Continued)

OTHER PUBLICATIONS

Office Action dated Mar. 21, 2017 for Chinese Application No. 201410066693.4, 7 pages.
(Continued)

*Primary Examiner* — Pinkal R Chokshi
(74) *Attorney, Agent, or Firm* — Sughrue Mion, PLLC

(57) ABSTRACT

An information pushing method and apparatus, and a terminal and server are provided. The method includes: acquiring a key frame of a currently-played video; acquiring an characteristic value of the key frame according to picture information of the key frame; acquiring, according to the characteristic value of the key frame, pushing information corresponding to the characteristic value; and displaying the pushing information in a process of playing the currently-played video. After the key frame of the currently-played video is acquired, the characteristic value of the key frame is acquired according to the picture information of the key frame, and the pushing information corresponding to the characteristic value is acquired according to the characteristic value of the key frame, so as to display the pushing information in the process of playing the currently-played video.

14 Claims, 7 Drawing Sheets

(51) Int. Cl.
*G06F 16/783* (2019.01)
*H04N 21/431* (2011.01)
*H04N 21/44* (2011.01)
*H04N 21/4722* (2011.01)
*H04N 21/658* (2011.01)
*H04N 21/81* (2011.01)
*H04L 29/08* (2006.01)
*H04N 21/234* (2011.01)
*H04N 21/235* (2011.01)
*H04N 21/4402* (2011.01)
*H04N 21/472* (2011.01)
*G06F 16/00* (2019.01)
*G06K 9/00* (2006.01)

(52) U.S. Cl.
CPC ........... *H04L 67/26* (2013.01); *H04N 21/235* (2013.01); *H04N 21/23418* (2013.01); *H04N 21/41407* (2013.01); *H04N 21/4316* (2013.01); *H04N 21/44008* (2013.01); *H04N 21/440263* (2013.01); *H04N 21/4722* (2013.01); *H04N 21/47202* (2013.01); *H04N 21/6581* (2013.01); *H04N 21/8133* (2013.01); *G06K 9/00744* (2013.01)

(58) Field of Classification Search
CPC ............. H04N 21/6581; H04N 21/235; H04N 21/440263; H04N 21/8133; H04N 21/47202; H04N 21/23418
See application file for complete search history.

(56) References Cited

U.S. PATENT DOCUMENTS

| | | | | |
|---|---|---|---|---|
| 2008/0226119 | A1* | 9/2008 | Candelore | G06F 17/30256 382/100 |
| 2013/0042261 | A1* | 2/2013 | Tavormina | G06Q 30/02 725/5 |
| 2013/0071031 | A1* | 3/2013 | Huang | G06K 9/46 382/190 |
| 2013/0094756 | A1* | 4/2013 | Li | G06Q 30/00 382/155 |
| 2014/0086552 | A1* | 3/2014 | Cheng | H04N 21/4316 386/230 |
| 2014/0286625 | A1* | 9/2014 | Matsubara | G06T 3/40 386/278 |
| 2015/0074599 | A1* | 3/2015 | Stein | G06F 3/0482 715/810 |
| 2015/0187064 | A1* | 7/2015 | Huang | G06T 7/0004 382/141 |
| 2017/0091556 | A1* | 3/2017 | Neumann | G06K 9/00718 |

FOREIGN PATENT DOCUMENTS

| | | |
|---|---|---|
| CN | 101753913 A | 6/2010 |
| CN | 102334118 A | 1/2012 |
| CN | 102547462 A | 7/2012 |
| CN | 102752540 A | 10/2012 |
| CN | 103218734 A | 7/2013 |
| CN | 103402118 A | 11/2013 |
| CN | 103475911 A | 12/2013 |
| CN | 103514242 A | 1/2014 |
| WO | WO 2005/002158 A1 | 1/2005 |
| WO | WO 2015127865 | 9/2015 |

OTHER PUBLICATIONS

International Search Report and Written Opinion received in PCT Application No. PCT/CN2015/072890 dated May 6, 2015.
Office Action dated Jan. 17, 2018 for Chinese Application No. 201410066693.4, 15 pages.

* cited by examiner ies in their entireties.

INFORMATION PUSHING METHOD, TERMINAL AND SERVER

CROSS REFERENCE TO RELATED APPLICATION

This application is a continuation application of International Application No. PCT/CN2015/072890, titled "INFORMATION PUSHING METHOD, THERMINAL AND SERVER", filed on Feb. 12, 2015, which claims priority to Chinese Patent Application No. 201410066693.4, filed on Feb. 26, 2014, both of which are incorporated herein by reference in their entireties.

FIELD OF THE TECHNOLOGY

The present disclosure relates to the field of computer technologies, and in particular, to an information pushing method, a terminal and server.

BACKGROUND OF THE DISCLOSURE

In a video playback process, a video server may push rich multimedia information such as actor information and product information to a terminal, so as to add interactivity and enjoyment to a video playback scenario.

In the video playback process, three information pushing manners are generally used. In the first manner, pushing information of each video is preset, corresponding pushing information is played before each video is played, and the video is played after playback of the pushing information is completed; in the second manner, pushing information is embedded in a plot such as a movie or a TV play, and when the movie or the TV play is played, information is pushed indirectly; in the third manner, a barrage function is set during video playback, for example, pushing information is rolled rapidly at the upper of a video playback window.

SUMMARY

According to an aspect, an information pushing method is provided, including:
acquiring a key frame of a currently-played video;
acquiring an characteristic value of the key frame according to picture information of the key frame; acquiring, according to the characteristic value of the key frame, pushing information corresponding to the characteristic value; and
displaying the pushing information in a process of playing the currently-played video.

According to another aspect, a terminal is provided, including:
a key frame acquisition module, configured to acquire a key frame of a currently-played video;
an characteristic value acquisition module, configured to acquire an characteristic value of the key frame according to picture information of the key frame;
an characteristic value uploading module, configured to upload the characteristic value of the key frame to a server, so that the server acquires pushing information corresponding to the characteristic value of the key frame;
a pushing information receiving module, configured to receive the pushing information returned by the server; and
a pushing information display module, configured to display the pushing information in a process of playing the currently-played video.

According to another aspect, a server is provided, including:
an characteristic value receiving module, configured to receive an characteristic value, uploaded by a terminal, of a key frame;
a pushing information determining module, configured to determine pushing information according to the characteristic value of the key frame and an characteristic value of pre-stored each piece of to-be-pushed information; and
a pushing information sending module, configured to send the pushing information to the terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and a person of ordinary skill in the art may still derive other drawings from the accompanying drawings without creative efforts.

DESCRIPTION OF EMBODIMENTS

In order to make the objectives, technical solutions and advantages of the present disclosure clearer, the embodiments of the present invention are described in detail in the following with reference to the accompanying drawings.

Figure 1:
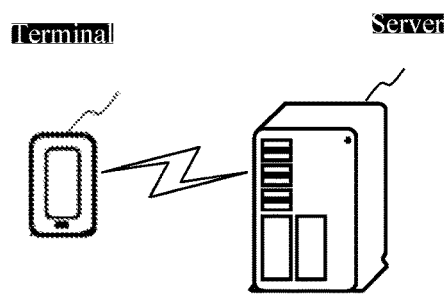
FIG. 1 is a schematic architectural diagram of an implementation environment according to an embodiment of the present invention.
Figure 2:
FIG. 2 is a schematic effect diagram of an information pushing scenario according to an embodiment of the present invention.

Before the embodiments of the present invention are described in detail, an application scenario of the embodiments of the present invention is illustrated first. Referring to FIG. 1, a typical application scenario of the embodiments of the present invention is: in a process of online video watching by a user by using a terminal, a server pushes information related to content of a currently-played video to the terminal, to enhance user experience. The terminal shown in the figure may be a personal computer or a mobile terminal. FIG. 1 only uses the terminal being a mobile terminal as an example for description. A specific process is: The terminal acquires a key frame of a currently-played video, and acquires an characteristic value of the key frame according to picture information of the key frame; then, uploads the characteristic value of the key frame to a server, so that the server acquires pushing information corresponding to the characteristic value of the key frame and returns the pushing information to the terminal. After receiving the pushing information returned by the server, in a process of playing the currently-played video, the terminal displays the pushing information, thereby improving accuracy and instantaneity of information pushing. As shown in FIG. 2, the terminal in FIG. 2 is playing a video related to a man. After acquiring the key frame shown in the figure, the terminal acquires an characteristic value of the key frame by using picture information (face data) in a round surrounding area of the key frame; after the terminal uploads the characteristic value of the key frame to the server, the server acquires, according to the characteristic value of the key frame, pushing information shown in the right part of FIG. 2. As can be known from the pushing information displayed in FIG. 2, the man is an anchor, and the pushing information not only includes personal introduction of the man, but also includes program information hosted by the man. For a detailed information pushing process, refer to the following embodiments.

Figure 3:
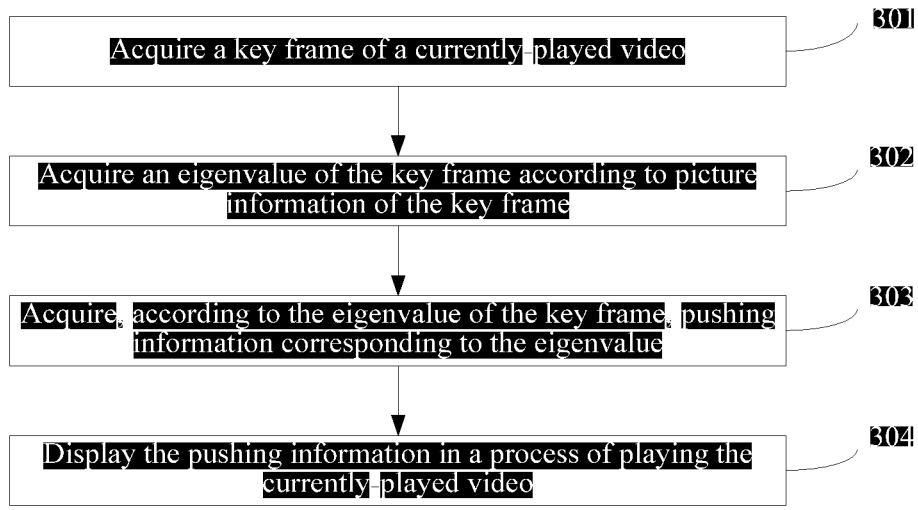
FIG. 3 is a flowchart of an information pushing method according to an embodiment of the present invention.

FIG. 3 is a flowchart of an information pushing method according to an embodiment of the present invention. Referring to FIG. 3, the method provided in this embodiment includes:

301: Acquire a key frame of a currently-played video.

302: Acquire an characteristic value of the key frame according to picture information of the key frame.

303: Acquire, according to the characteristic value of the key frame, pushing information corresponding to the characteristic value.

304: Display the pushing information in a process of playing the currently-played video.

In the method provided in this embodiment, after a key frame of a currently-played video is acquired, an characteristic value of the key frame is acquired according to picture information of the key frame, and pushing information corresponding to the characteristic value is acquired according to the characteristic value of the key frame, so as to display the pushing information in a process of playing the currently-played video. Because the pushing information is acquired based on the key frame of the currently-played video, relevancy between the pushing information and the currently-played video is high, information pushing accuracy is greatly improved, and instantaneity of information pushing is better.

In some embodiments, the acquiring a key frame of a currently-played video includes:

acquiring a first frame of the currently-played video, and using the first frame as the key frame of the currently-played video; or, acquiring a currently-played frame of the currently-played video, and using the currently-played frame as the key frame of the currently-played video; or, acquiring a video cover frame of the currently-played video, and using the video cover frame as the key frame of the currently-played video.

In some embodiments, the acquiring, according to the characteristic value of the key frame, pushing information corresponding to the characteristic value includes:

for each piece of to-be-pushed information in pre-stored multiple pieces of to-be-pushed information, determining whether the number of data bits, different from data bits in the characteristic value of the key frame, in an characteristic value of the to-be-pushed information is less than a first preset value; and if the number of the data bits, different from the data bits in the characteristic value of the key frame, in the characteristic value of the to-be-pushed information is less than the first preset value, determining the to-be-pushed information as the pushing information; or, for each piece of to-be-pushed information in pre-stored multiple pieces of to-be-pushed information, determining whether a percentage accounted for by data bits, different from data bits in the characteristic value of the key frame, in an characteristic value of the to-be-pushed information is less than a second preset value; and if the percentage accounted for by the data bits, different from the data bits in the characteristic value of the key frame, in the characteristic value of the to-be-pushed information is less than the second preset value, determining the to-be-pushed information as the pushing information.

In some embodiments, the method further includes:

performing the step of acquiring a key frame of a currently-played video when a playback pause instruction for the currently-played video is detected in the process of playing the currently-played video; or, performing the step of acquiring a key frame of a currently-played video when a playback instruction for the currently-played video is detected, and performing the step of displaying the pushing information according to the pre-acquired pushing information when a playback pause instruction for the currently-played video is detected in the process of playing the currently-played video.

In some embodiments, the acquiring an characteristic value of the key frame according to picture information of the key frame includes:

zooming out the key frame, to obtain a first processed picture;

performing color simplification processing on the first processed picture, to obtain a second processed picture; and acquiring the characteristic value of the key frame according to a pixel point of the second processed picture.

In some embodiments, the zooming out the key frame, to obtain a first processed picture includes:

zooming out the key frame according to a first preset size, and using a picture after zoom out as the first processed picture; or, selecting a key block, having a size being a second preset size, in the key frame, and using the key block as the first processed picture.

In some embodiments, the selecting a key block, having a size being a second preset size, in the key frame includes:

using a block, satisfying the second preset size and having a color change conforming to a preset regularity, in the first processed picture as the key block; or, using a block, including human face data and satisfying the second preset size, in the first processed picture as the key block; or, using a block, including a key word and satisfying the second preset size, in the first processed picture as the key block.

In some embodiments, the acquiring the characteristic value of the key frame according to picture information of the second processed picture includes:

calculating a grayscale value of each pixel point in the second processed picture;

calculating an average grayscale value of all pixel points in the second processed picture;

comparing the grayscale value of each pixel point with the average grayscale value, to obtain multiple comparison results; and obtaining the characteristic value of the key frame according to the multiple comparison results.

In some embodiments, the displaying the pushing information includes:

presetting an area in a display image of the currently-played video, and placing the pushing information on the display image of the currently-played video for displaying.

Any combination of the foregoing optional technical solutions can be used to form an optional embodiment of the present invention, and no further details are provided herein.

Figure 4:
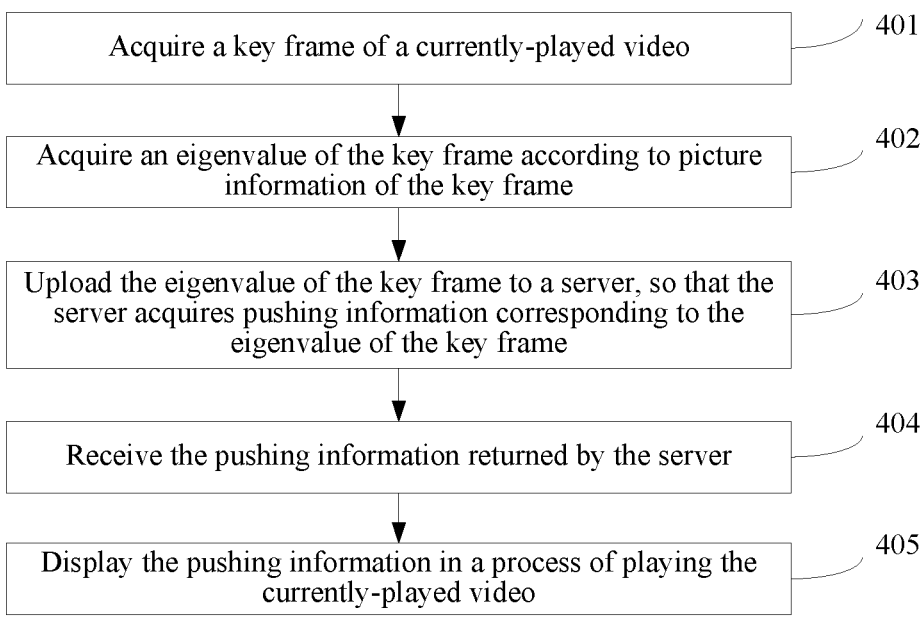
FIG. 4 is a flowchart of an information pushing method according to another embodiment of the present invention.

FIG. 4 is a flowchart of an information pushing method according to an embodiment of the present invention. Using that a terminal executes this method as an example, referring to FIG. 4, a process of the method provided in this embodiment includes:

401: Acquire a key frame of a currently-played video.

402: Acquire an characteristic value of the key frame according to picture information of the key frame.

403: Upload the characteristic value of the key frame to a server, so that the server acquires pushing information corresponding to the characteristic value of the key frame.

404: Receive the pushing information returned by the server.

405: Display the pushing information in a process of playing the currently-played video.

In the method provided in this embodiment, after a key frame of a currently-played video is acquired, an characteristic value of the key frame is acquired according to picture information of the key frame, and the characteristic value of the key frame is uploaded to a server, so that the server acquires pushing information corresponding to the characteristic value of the key frame; after the pushing information returned by the server is received, the pushing information is displayed in a process of playing the currently-played video. Because the pushing information is acquired based on the key frame of the currently-played video, relevancy between the pushing information and the currently-played video is high, information pushing accuracy is greatly improved, and instantaneity of information pushing is better.

In some embodiments, the acquiring a key frame of a currently-played video includes:

acquiring a first frame of the currently-played video, and using the first frame as the key frame of the currently-played video; or, acquiring a currently-played frame of the currently-played video, and using the currently-played frame as the key frame of the currently-played video; or, acquiring a video cover frame of the currently-played video, and using the video cover frame as the key frame of the currently-played video.

In some embodiments, the displaying the pushing information includes:

presetting an area in a display image of the currently-played video, and placing the pushing information on the display image of the currently-played video for displaying.

Any combination of the foregoing optional technical solutions can be used to form an optional embodiment of the present invention, and no further details are provided herein.

Figure 5:
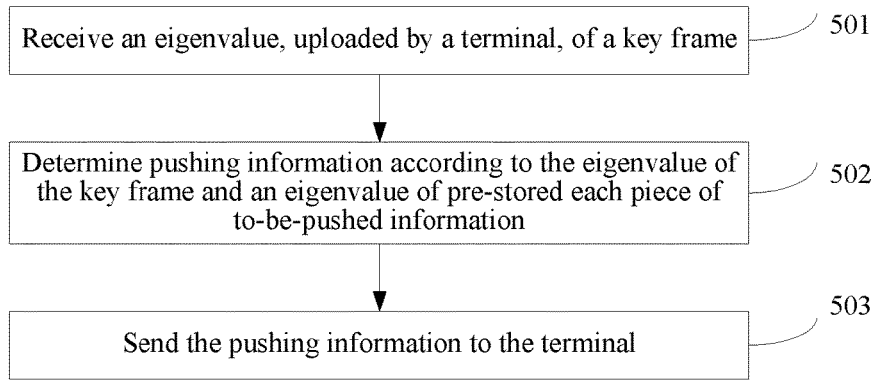
FIG. 5 is a flowchart of an information pushing method according to another embodiment of the present invention.

FIG. 5 is a flowchart of an information pushing method according to an embodiment of the present invention. Using that a server executes this method as an example, referring to FIG. 5, a process of the method provided in this embodiment includes:

501: Receive an characteristic value, uploaded by a terminal, of a key frame.

502: Determine pushing information according to the characteristic value of the key frame and an characteristic value of pre-stored each piece of to-be-pushed information.

503: Send the pushing information to the terminal.

In the method provided in this embodiment, after an characteristic value, uploaded by a terminal, of a key frame is received, pushing information is determined according to the characteristic value of the key frame and an characteristic value of pre-stored each piece of to-be-pushed information, and the pushing information is sent to the terminal. Because the pushing information is acquired based on the key frame of the currently-played video, relevancy between the pushing information and the currently-played video is high, information pushing accuracy is greatly improved, and instantaneity of information pushing is better.

In some embodiments, the determining pushing information according to the characteristic value of the key frame and an characteristic value of each piece of to-be-pushed information includes:

for each piece of to-be-pushed information in pre-stored multiple pieces of to-be-pushed information, determining whether the number of data bits, different from data bits in the characteristic value of the key frame, in an characteristic value of the to-be-pushed information is less than a first preset value; and if the number of the data bits, different from the data bits in the characteristic value of the key frame, in the characteristic value of the to-be-pushed information is less than the first preset value, determining the to-be-pushed information as the pushing information; or, for each piece of to-be-pushed information in pre-stored multiple pieces of to-be-pushed information, determining whether a percentage accounted for by data bits, different from data bits in the characteristic value of the key frame, in an characteristic value of the to-be-pushed information is less than a second preset value; and if the percentage accounted for by the data bits, different from the data bits in the characteristic value of the key frame, in the characteristic value of the to-be-pushed information is less than the second preset value, determining the to-be-pushed information as the pushing information.

In some embodiments, before the determining pushing information according to the characteristic value of the key frame and an characteristic value of pre-stored each piece of to-be-pushed information, the method further includes:

for each piece of to-be-pushed information in the pre-stored multiple pieces of to-be-pushed information, zooming out the to-be-pushed information, to obtain a first processed picture;

performing color simplification processing on the first processed picture, to obtain a second processed picture; and acquiring the characteristic value of the to-be-pushed information according to picture information of the second processed picture.

In some embodiments, the zooming out the to-be-pushed information, to obtain a first processed picture includes:

zooming out the to-be-pushed information according to a first preset size, and using a picture after zoom out as the first processed picture; or, selecting a key block, having a size being a second preset size, in the to-be-pushed information, and using the key block as the first processed picture.

In some embodiments, the acquiring the characteristic value of the to-be-pushed information according to picture information of the second processed picture includes:

calculating a grayscale value of each pixel point in the second processed picture;

calculating an average grayscale value of all pixel points in the second processed picture;

comparing the grayscale value of each pixel point with the average grayscale value, to obtain multiple comparison results; and obtaining the characteristic value of the to-be-pushed information according to the multiple comparison results.

Any combination of the foregoing optional technical solutions can be used to form an optional embodiment of the present invention, and no further details are provided herein.

Figure 6:
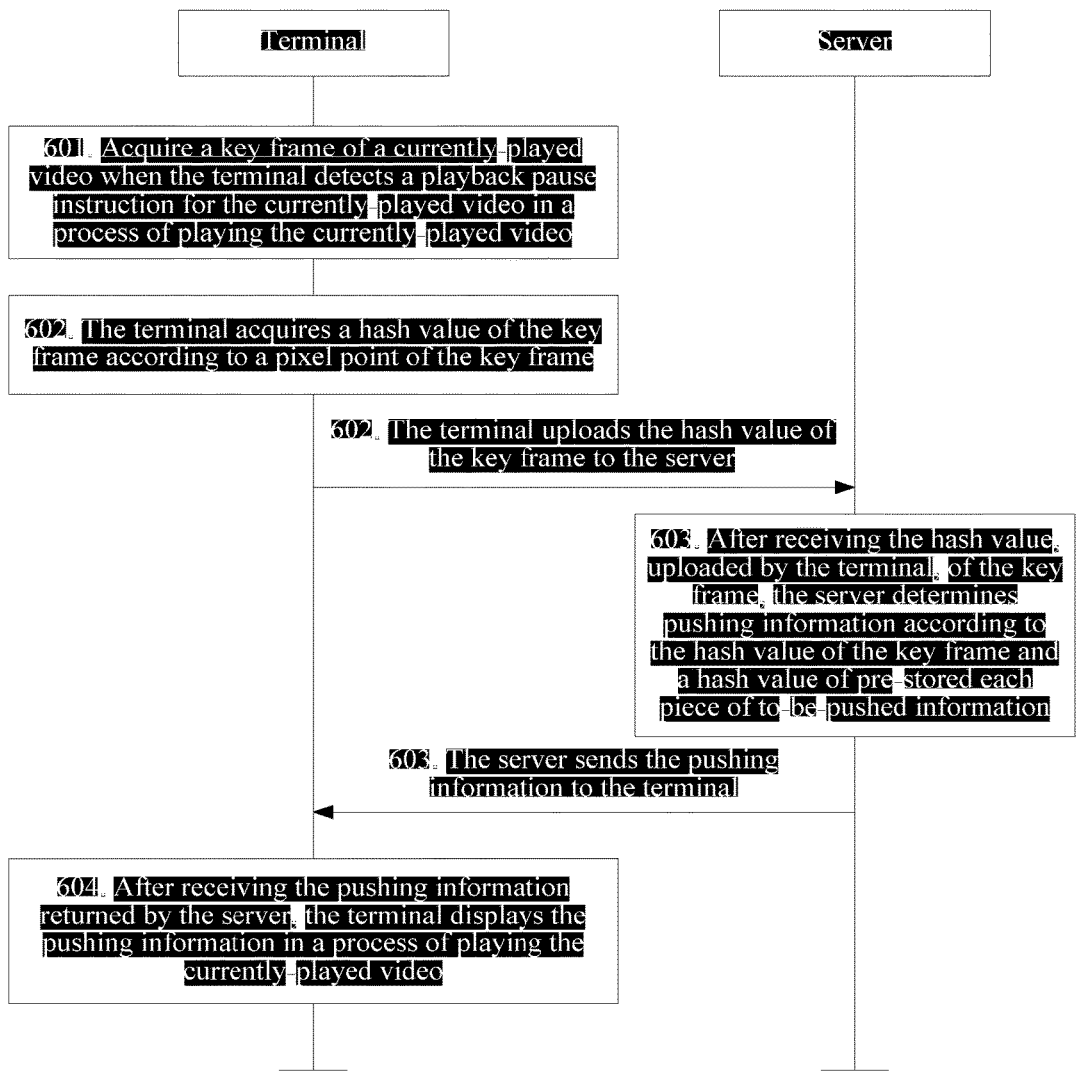
FIG. 6 is a flowchart of an information pushing method according to another embodiment of the present invention.

FIG. 6 is a flowchart of an information pushing method according to an embodiment of the present invention. Interaction bodies are a server and a terminal. The information pushing manner provided in this embodiment is described and explained in detail by using an example in which an characteristic value is a hash value and picture information is a pixel point. Referring to FIG. 6, the method provided in this embodiment includes:

601: Acquire a key frame of a currently-played video when the terminal detects a playback pause instruction for the currently-played video in a process of playing the currently-played video.

In this embodiment, in order not to affect watching experience of a user, when a video is being played, acquisition or displaying of pushing information is not performed. A display interface of the terminal has a limited size; if the acquired pushing information is displayed when the video is being played, the pushing information may occupy a part of the display interface, causing bad impacts on watching effect of the user. Therefore, in this embodiment, the step of acquiring a key frame of a currently-played video is performed only when the playback pause instruction for the currently-played video is detected. In addition, when a clicking operation of the user for a playback pause button on the display interface of the terminal is detected, the playback pause instruction for the currently-played video is triggered.

In addition, the key frame of the currently-played video may be acquired in the following three manners.

In the first manner, a first frame of the currently-played video is acquired, and the first frame is used as the key frame of the currently-played video.

The first frame of the currently-played video refers to the first frame of the currently-played video according to a sequence of play time.

In the second manner, a currently-played frame of the currently-played video is acquired, and the currently-played frame is used as the key frame of the currently-played video.

In the third manner, a video cover frame of the currently-played video is acquired, and the video cover frame is used as the key frame of the currently-played video.

The cover frame of the currently-played video is a frame closely related to content of the currently-played video, is similar to a poster photo, and has representativeness.

602: The terminal acquires a hash value of the key frame according to a pixel point of the key frame, and uploads the hash value of the key frame to the server.

The acquiring a hash value of the key frame according to a pixel point of the key frame may specifically may include the following step 602*a* to step 602*c*.

602*a*: Zoom out the key frame, to obtain a first processed picture.

In this embodiment, the zooming out the key frame, to obtain a first processed picture includes the following two manners:

In the first manner: the key frame is zoomed out according to a first preset size, and a picture after zoom out is used as the first processed picture.

The first preset size specifically may be 8 pixels*8 pixels. Certainly, in addition to the foregoing numerical value, the first preset size may also be another numerical value, such as 16 pixels*16 pixels, and the first preset size is not specifically limited in this embodiment.

When the key frame is zoomed out, whatever an original size of the key frame is, length and width of the key frame are zoomed out according to the first preset size, to obtain the first processed picture shown in FIG. 7(*a*).

In the second manner, a key block, having a size being a second preset size, in the key frame is selected, and the key block is used as the first processed picture.

The second preset size specifically may be 8 pixels*8 pixels. Certainly, in addition to the foregoing numerical value, the second preset size may also be another numerical value, such as 16 pixels*16 pixels, and the second preset size is not specifically limited in this embodiment. The second preset size may be the same as or different from the first preset size, which is not specifically limited in this embodiment.

In some embodiments, when the key block, having a size being the second preset size, in the key frame is selected, the following rules may be conformed to:

Rule 1: Use a block, satisfying the second preset size and having a color change conforming to a preset regularity, in the first processed picture as the key block.

The block having the color change conforming to the preset regularity refers to a block in which a density degree of color change is greater than a specified value.

Rule 2: Use a block, including human face data and satisfying the second preset size, in the first processed picture as the key block.

For a movie or a TV play, playback focuses on people; therefore, the block including the human face data is used as the key block, and when information pushing is performed subsequently, actor information or information about movies and television programs and the like corresponding to the human face data is pushed. Continue to use the key frame in FIG. 7(*a*) as an example, and after the key frame is zoomed out in the second manner, the first processed picture shown in FIG. 7(*b*) may be obtained.

Rule 3: Use a block, including a key word and satisfying the second preset size, in the first processed picture as the key block.

Some videos may be sound videos only including text. In this case, a block, including some key words, in the key frame may be used as the key block. A location of the key word may be a location of a pointer of the terminal. That is, the user may be guided to determine the key word. As shown in FIG. 7(*c*), if the key frame only includes text, the key block may be determined according to the location of the pointer of the terminal.

Figure 7A:
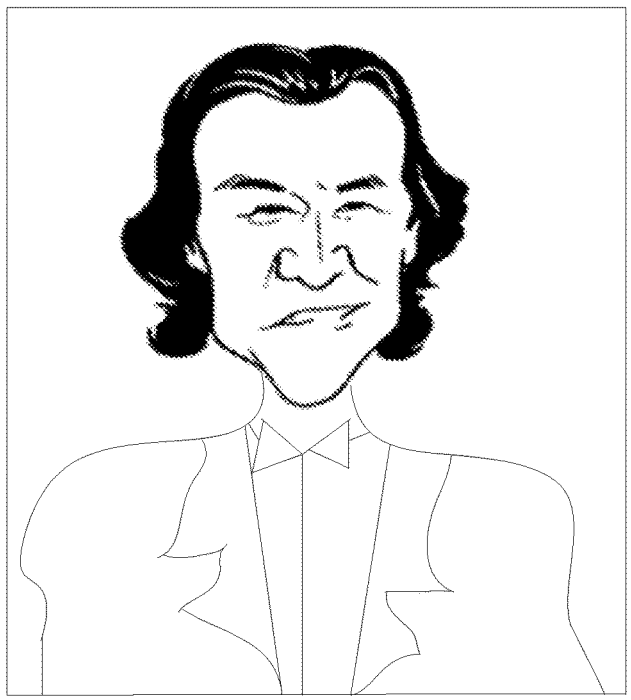
FIG. 7(a) is a schematic diagram of a first type of first processed picture according to another embodiment of the present invention.
Figure 7A:
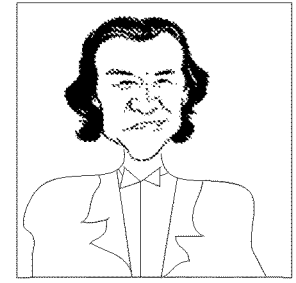
Figure 7B:
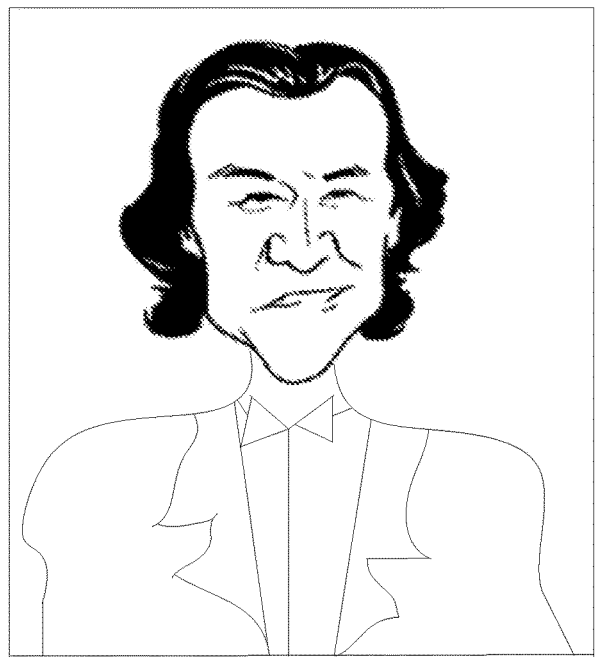
FIG. 7(b) is a schematic diagram of a second type of first processed picture according to another embodiment of the present invention.
Figure 7B:
Figure 7C:
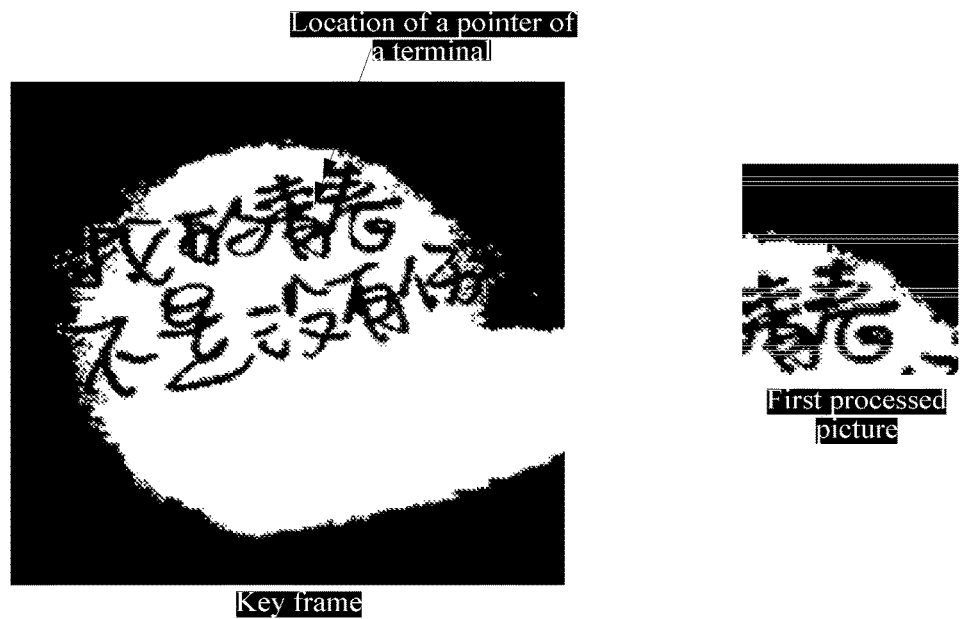
FIG. 7(c) is a schematic diagram of a third type of first processed picture according to another embodiment of the present invention.

It should be noted that, no matter which of the foregoing three rules is used to determine a key block, a first processed picture similar to the first processed pictures shown in FIG. 7(a) and FIG. 7(b) can be obtained.

602b: Perform color simplification processing on the first processed picture, to obtain a second processed picture.

For a colored picture, one picture includes multiple colors. To reduce workload of subsequent processing, in this step, color simplification processing is performed on the first processed picture, so that the types of colors included in the second processed picture is far less than the types of colors included in the first processed picture, and the first processed picture including multiple colors may even be transformed to a grayscale picture or a black-and-white picture. For example, if a size of the first processed picture is 8 pixels*8 pixels, after the color simplification processing, the second processed picture may be transformed to 64-level grayscale, that is, all pixel points in the second processed picture include 64 colors in total.

602c: Acquire the hash value of the key frame according to the pixel point of the second processed picture.

The acquiring the hash value of the key frame according to the pixel point of the second processed picture is specifically divided into the following four sub-steps:

Step 1: Calculate a grayscale value of each pixel point in the second processed picture.

That the size of the second processed picture is 8 pixels*8 pixels is used as an example; therefore, a grayscale value of each pixel point in the 64 pixel points of the second processed picture may be calculated according to a rapid grayscale calculation algorithm.

Step 2: Calculate an average grayscale value of all pixel points in the second processed picture.

If grayscale values of the 64 pixel points are marked respectively by using symbols $x1, x2, x3, \ldots, x64$, and an average grayscale value is marked by using a symbol $\bar{x}$, $$\bar{x} = \frac{x1 + x2 + x3 + \ldots + x64}{64}.$$

Step 3: Compare the grayscale value of each pixel point with the average grayscale value, to obtain multiple comparison results.

Each of the grayscale values $x1, x2, x3, \ldots, x64$ of all pixel points is compared with the average grayscale value $\bar{x}$; if a grayscale value of a pixel point is greater than or equal to the average grayscale value $\bar{x}$, the comparison result is 1; if a grayscale value of a pixel point is less than the average grayscale value $\bar{x}$, the comparison result is 0; when all pixel points are traversed, 64 comparison results can be obtained, that is, 64 binary numerical values.

Step 4: Obtain the hash value of the key frame according to the multiple comparison results.

The 64 binary numerical values obtained in step 3 are combined according to a preset sequence to obtain a 64-bit integer, where the integer is the hash value of the key frame, and is also called a fingerprint of the key frame.

Figure 8:
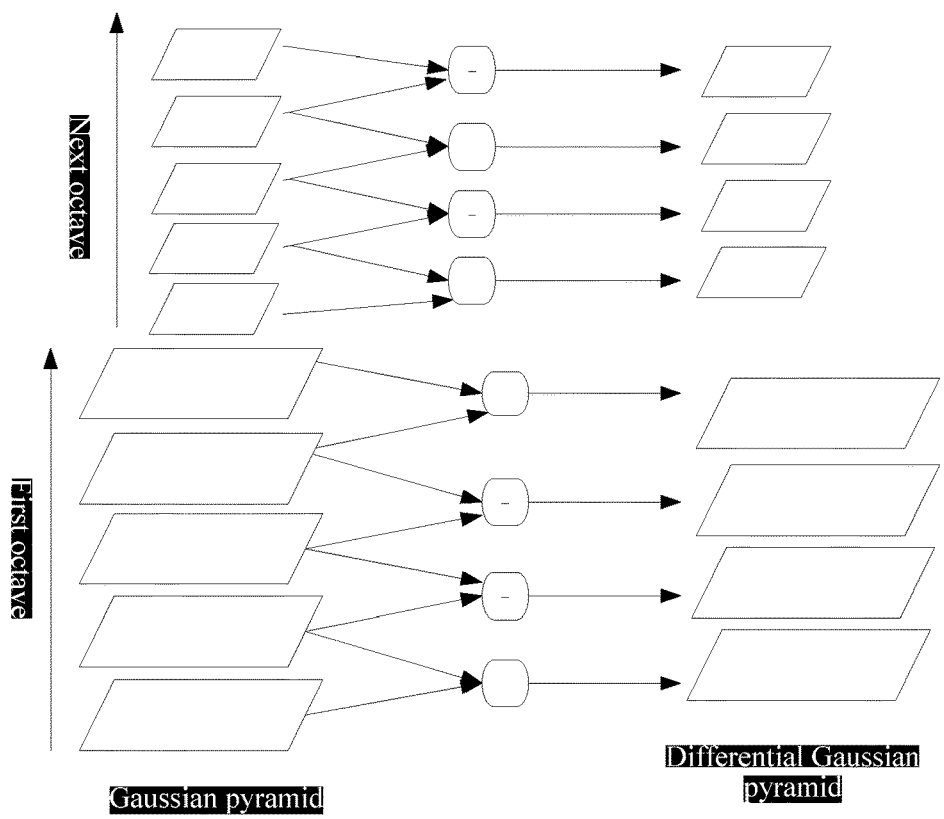
FIG. 8 is schematic diagram of an octave picture according to another embodiment of the present invention.

It should be noted that, in step 602, a perceptual hash algorithm is used to calculate the hash value of the key frame. Certainly, in addition to the perceptual hash algorithm, an improved pHash/SIFT algorithm may also be used to calculate the hash value of the key frame. The perceptual hash algorithm has advantages in identifying a plane picture, but is poor in identifying a deformation picture. An improved algorithm for detecting partial features is used; for the key frame of the currently-played video, octave pictures having different scales are created, and have corresponding interest points at each scale. The scale of the first octave is the size of the original picture, and each sub-layer thereafter is a result of downsampling on a previous sub-layer, that is, ¼ (both the length and the width are halved) of the original picture forms the next octave, as shown in FIG. 8. In FIG. 8, each octave includes five pictures, and a size of each picture in the first octave is 4 times a size of each picture in the next octave. That is, both the length and the width of each picture in the first octave are halved, to obtain each picture in the next octave. In FIG. 8, the left is the Gaussian pyramid, and the right is the differential Gaussian pyramid; adjacent upper-layer and lower-layer pictures in each octave in the Gaussian pyramid are subtracted to obtain the differential Gaussian pyramid. After the differential Gaussian pyramid is obtained, the characteristic value of the picture may be extracted according to the differential Gaussian pyramid. Although the algorithm is more complex, the principle is the same as that of the perceptual hash algorithm, and the characteristic value of the key frame is just calculated by using another algorithm. In addition, this algorithm can identify a deformation picture, and is highly tolerant to changes in illumination, noise, and minor changes in viewpoint. The extracted characteristic value include a large amount of information, and relatively easy to match against a database having a large number of parameters and few errors occur; therefore, they are suitable for rapid and accurate matching in a large-volume database.

603: After receiving the hash value, uploaded by the terminal, of the key frame, the server determines pushing information according to the hash value of the key frame and a hash value of pre-stored each piece of to-be-pushed information, and sends the pushing information to the terminal.

In this embodiment, the determining pushing information according to the hash value of the key frame and a hash value of each piece of to-be-pushed information may be implemented in the following two manners.

In the first manner, for each piece of to-be-pushed information in pre-stored multiple pieces of to-be-pushed information, whether the number of data bits, different from data bits in the hash value of the key frame, in a hash value of the to-be-pushed information is less than a first preset value is determined; and if the number of the data bits, different from the data bits in the hash value of the key frame, in the hash value of the to-be-pushed information is less than the first preset value, the to-be-pushed information is determined as the pushing information.

The first preset value may be 5. Certainly, in addition to the foregoing numerical value, the first preset value may also be another numerical value, such as 4 or 6, and the first preset value is not specifically limited in this embodiment. If the hash value is a hexadecimal character string, the hash value is first converted to a binary character string and then is compared. The hash value of the to-be-pushed information is compared with the hash value of the key frame bit by bit, and the number of different bits between the two is recorded; if the number of different bits between the two is less than the preset value, it is considered that the two have similar content, and the to-be-pushed information is determined as the pushing information.

In the second manner, for each piece of to-be-pushed information in pre-stored multiple pieces of to-be-pushed information, whether a percentage accounted for by data bits, different from data bits in the characteristic value of the key frame, in an characteristic value of the to-be-pushed information is less than a second preset value is determined; and if the percentage accounted for by the data bits, different from the data bits in the characteristic value of the key frame, in the characteristic value of the to-be-pushed information is less than the second preset value, the to-be-pushed information is determined as the pushing information.

The second preset value may be 2%. Certainly, in addition to the foregoing numerical value, the second preset value may also be another numerical value, such as 1% or 3%, and the second preset value is not specifically limited in this embodiment. If the hash value is a hexadecimal character string, the hash value is first converted to a binary character string and then is compared. The hash value of the to-be-pushed information is compared with the hash value of the key frame bit by bit, and the number of different bits between the two is recorded; if a percentage occupied for by the number of the different bits between the two is less than the second preset value, it is considered that the two have similar content, and the to-be-pushed information is determined as the pushing information.

It should be noted that, when the pushing information is determined according to the hash value of the key frame and the hash value of each piece of to-be-pushed information, in addition to the foregoing two manners, a manner of determining whether a percentage accounted for by the number of same bits in the hash value of the to-be-pushed information and the hash value of the key frame is greater than a first specified value may be used, or, a manner of determining whether the number of same bits in the hash value of the to-be-pushed information and the hash value of the key frame is greater than a second specified value is used. A specific determining manner is not specifically limited in this embodiment.

In some embodiments, the server stores a larger amount of to-be-pushed information, so that after the hash value, uploaded by the terminal, of the key frame is received, pushing information corresponding to the hash value of key frame can be rapidly determined. The server may pre-calculate hash values of all stored pushing information. After the hash value, uploaded by the terminal, of the key frame is received, comparison may be directly performed on hash values of the to-be-pushed information and the key frame. A manner of calculating the hash value of the to-be-pushed information is the same as a manner of calculating the hash value of the key frame in step 602. It should be noted that, when the key frame and the to-be-pushed information are zoomed out, the two need to be processed by using a same preset size, to ensure that the numbers of data bits in the obtained hash values are the same. When binary numbers of the to-be-pushed information and the key frame are combined, the two need to be combined by using a consistent combination sequence, to ensure that each data bit in the obtained hash values is in a correspondence relationship. That the server calculates the hash value of each piece of to-be-pushed information mainly includes the following steps:

603a: For each piece of to-be-pushed information in the pre-stored multiple pieces of to-be-pushed information, zoom out the to-be-pushed information, to obtain a first processed picture.

The zooming out the to-be-pushed information, to obtain a first processed picture includes:

zooming out the to-be-pushed information according to a first preset size, and using a picture after zoom out as the first processed picture; or, selecting a key block, having a size being a second preset size, in the to-be-pushed information, and using the key block as the first processed picture.

603b: Perform color simplification processing on the first processed picture, to obtain a second processed picture.

603c: Acquire the hash value of the to-be-pushed information according to the pixel point of the second processed picture.

The acquiring the hash value of the to-be-pushed information according to a pixel point of the second processed picture includes:

calculating a grayscale value of each pixel point in the second processed picture; calculating an average grayscale value of all pixel points in the second processed picture; comparing the grayscale value of each pixel point with the average grayscale value, to obtain multiple comparison results; and obtaining the hash value of the to-be-pushed information according to the multiple comparison results.

For specific explanation and description of the foregoing step 603a to step 603c, reference may be made to step 602, and no further details are provided herein.

604: After receiving the pushing information returned by the server, the terminal displays the pushing information in a process of playing the currently-played video.

In this embodiment, the pushing information may be displayed in the following manner:

presetting an area in a display image of the currently-played video, and placing the pushing information on the display image of the currently-played video for displaying.

Figure 9:
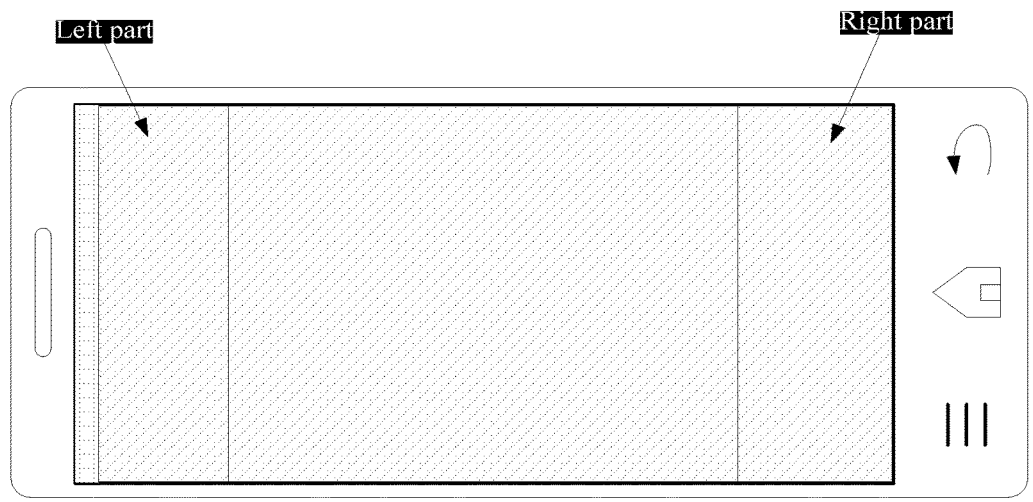
FIG. 9 is schematic diagram of a terminal display image according to another embodiment of the present invention.
Figure 10:
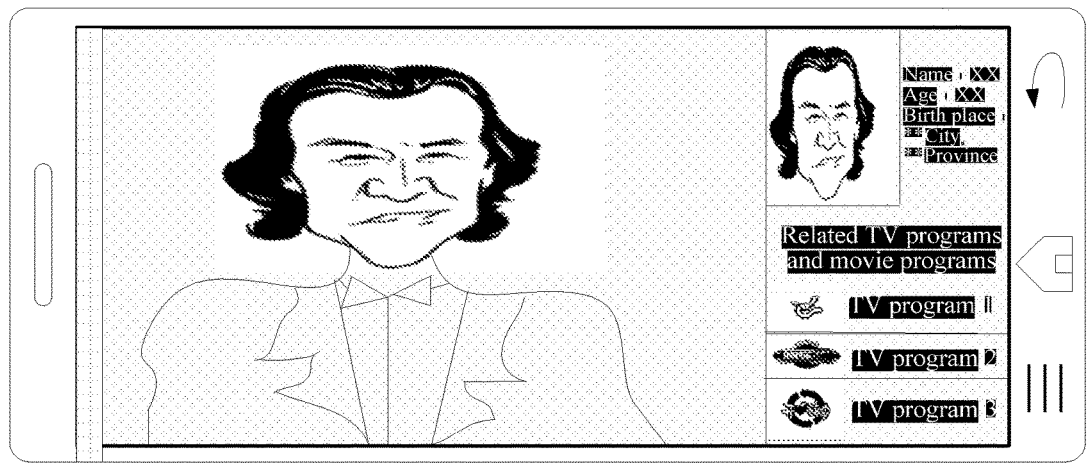
FIG. 10 is schematic diagram showing pushing information being displayed on a terminal display image according to another embodiment of the present invention.

The preset area may be the right area of the display image shown in FIG. 9. Certainly, the preset area may also be the left area of the display image shown in FIG. 9, and a position of the preset area is not specifically limited in this embodiment. When the pushing information is displayed, the pushing information is placed on the display image of the currently-played video, that is, the pushing information is displayed in the forefront. If the preset area is the right area of the display image, when the pushing information is displayed, a schematic diagram of the display image may be shown in FIG. 10.

It should be noted that, in order to provide a better watching experience to the user, when the video is being played, information is not pushed in this embodiment. In this embodiment, the step of acquiring a key frame of a currently-played video is performed only when the playback pause instruction for the currently-played video is detected. In some embodiments, in addition to this information pushing manner, another information pushing manner may also be used. That is, the step of acquiring a key frame of a currently-played video is performed when a playback instruction for the currently-played video is detected, and the step of displaying the pushing information is performed according to the pre-acquired pushing information when a playback pause instruction for the currently-played video is detected in the process of playing the currently-played video. A specific manner is not specifically limited in this embodiment. In some embodiments, after the pushing information is displayed for a preset time period, the pushing information may be automatically hidden, so as to avoid poor impact on watching experience of the user caused by the fact that the pushing information is displayed on the terminal interface for a long time.

In the method provided in this embodiment, after a key frame of a currently-played video is acquired, a hash value of the key frame is acquired according to a pixel point of the key frame, and pushing information corresponding to the hash value is acquired according to the hash value of the key frame, so as to display the pushing information in a process of playing the currently-played video. Because the pushing information is acquired based on the key frame of the currently-played video, relevancy between the pushing information and the currently-played video is high, information pushing accuracy is greatly improved, instantaneity of information pushing is better, and user experience is better.

Figure 11:
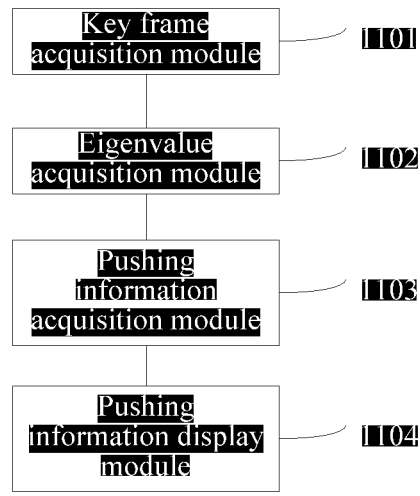
FIG. 11 is a schematic structural diagram of an information pushing apparatus according to another embodiment of the present invention.

FIG. 11 shows an information pushing apparatus according to an embodiment of the present invention. Referring to FIG. 11, the apparatus includes: a key frame acquisition module 1101, an characteristic value acquisition module 1102, a pushing information acquisition module 1103, and a pushing information display module 1104, where the key frame acquisition module 1101 is configured to acquire a key frame of a currently-played video; the characteristic value acquisition module 1102 is connected to the key frame acquisition module 1101 and is configured to acquire an characteristic value of the key frame according to picture information of the key frame; the pushing information acquisition module 1103 is connected to the characteristic value acquisition module 1102 and is configured to acquire, according to the characteristic value of the key frame, pushing information corresponding to the characteristic value; and the pushing information display module 1104 is connected to the pushing information acquisition module 1103 and is configured to display the pushing information in a process of playing the currently-played video.

In some embodiments, the key frame acquisition module is configured to acquire a first frame of the currently-played video, and use the first frame as the key frame of the currently-played video; or, acquire a currently-played frame of the currently-played video, and use the currently-played frame as the key frame of the currently-played video; or, acquire a video cover frame of the currently-played video, and use the video cover frame as the key frame of the currently-played video.

In some embodiments, the pushing information acquisition module is configured to: for each piece of to-be-pushed information in pre-stored multiple pieces of to-be-pushed information, determine whether the number of data bits, different from data bits in the characteristic value of the key frame, in an characteristic value of the to-be-pushed information is less than a first preset value; and if the number of the data bits, different from the data bits in the characteristic value of the key frame, in the characteristic value of the to-be-pushed information is less than the first preset value, determine the to-be-pushed information as the pushing information; or, for each piece of to-be-pushed information in pre-stored multiple pieces of to-be-pushed information, determine whether a percentage accounted for by data bits, different from data bits in the characteristic value of the key frame, in an characteristic value of the to-be-pushed information is less than a second preset value; and if the percentage accounted for by the data bits, different from the data bits in the characteristic value of the key frame, in the characteristic value of the to-be-pushed information is less than the second preset value, determine the to-be-pushed information as the pushing information.

In some embodiments, the key frame acquisition module is configured to perform the step of acquiring a key frame of a currently-played video when a playback pause instruction for the currently-played video is detected in the process of playing the currently-played video; or, perform the step of acquiring a key frame of a currently-played video when a playback instruction for the currently-played video is detected; and the pushing information display module is configured to perform the step of displaying the pushing information according to the pre-acquired pushing information when a playback pause instruction for the currently-played video is detected in the process of playing the currently-played video.

In some embodiments, the characteristic value acquisition module includes:

a size zooming out unit, configured to zoom out the key frame, to obtain a first processed picture;

a color simplification unit, configured to perform color simplification processing on the first processed picture, to obtain a second processed picture; and an characteristic value acquisition unit, configured to acquire the characteristic value of the key frame according to picture information of the second processed picture.

In some embodiments, the size zooming out unit is configured to zoom out the key frame according to a first preset size, and use a picture after zoom out as the first processed picture; or, select a key block, having a size being a second preset size, in the key frame, and use the key block as the first processed picture.

In some embodiments, the size zooming out unit is configured to use a block, satisfying the second preset size and having a color change conforming to a preset regularity, in the first processed picture as the key block; or, use a block, including human face data and satisfying the second preset size, in the first processed picture as the key block; or, use a block, including a keyword and satisfying the second preset size, in the first processed picture as the key block.

In some embodiments, the characteristic value acquisition module is configured to calculate a grayscale value of each pixel point in the second processed picture; calculate an average grayscale value of all pixel points in the second processed picture; compare the grayscale value of each pixel point with the average grayscale value, to obtain multiple comparison results; and obtain the characteristic value of the key frame according to the multiple comparison results.

In some embodiments, the pushing information display module is configured to preset an area in the display image of the currently-played video, and place the pushing information on the display image of the currently-played video for displaying.

In the apparatus provided by the present disclosure, after a key frame of a currently-played video is acquired, an characteristic value of the key frame is acquired according to picture information of the key frame, and pushing information corresponding to the characteristic value is acquired according to the characteristic value of the key frame, so as to display the pushing information in a process of playing the currently-played video. Because the pushing information is acquired based on the key frame of the currently-played video, relevancy between the pushing information and the currently-played video is high, information pushing accuracy is greatly improved, and instantaneity of information pushing is better.

It should be noted that: when the information pushing apparatus provided by the foregoing embodiments performs information pushing, it is illustrated with an example of division of each function module. In a practical application, the functions may be distributed to different function modules for implementation according to the requirements, that is, an internal structure of the device is divided into different function modules, so as to implement all or a part of the functions described above. Besides, the information pushing apparatus provided by the foregoing embodiment and the embodiments of the information pushing methods belong to one concept. For a specific implementation procedure, refer to the method embodiments, and no further details are provided herein.

Figure 12:
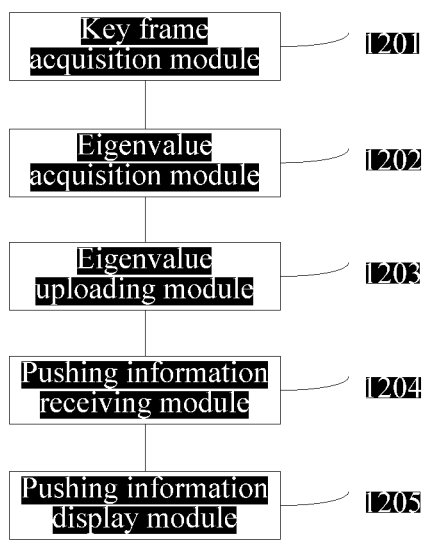
FIG. 12 is schematic structural diagram of a terminal according to another embodiment of the present invention.

FIG. 12 shows a terminal according to an embodiment of the present invention. Referring to FIG. 12, the terminal includes: a key frame acquisition module 1201, an characteristic value acquisition module 1202, an characteristic value uploading module 1203, a pushing information receiving module 1204, and a pushing information display module 1205, where the key frame acquisition module 1201 is configured to acquire a key frame of a currently-played video; the characteristic value acquisition module 1202 is connected to the key frame acquisition module 1201 and is configured to acquire an characteristic value of the key frame according to picture information of the key frame; the characteristic value uploading module 1203 is connected to the characteristic value acquisition module 1202 and is configured to upload the characteristic value of the key frame to a server, so that the server acquires pushing information corresponding to the characteristic value of the key frame; the pushing information receiving module 1204 is connected to the characteristic value uploading module 1203 and is configured to receive the pushing information returned by the server; and the pushing information display module 1205 is connected to the pushing information receiving module 1204 and is configured to display the pushing information in a process of playing the currently-played video.

In some embodiments, the key frame acquisition module is configured to acquire a first frame of the currently-played video, and use the first frame as the key frame of the currently-played video; or, acquire a currently-played frame of the currently-played video, and use the currently-played frame as the key frame of the currently-played video; or, acquire a video cover frame of the currently-played video, and use the video cover frame as the key frame of the currently-played video.

In some embodiments, the pushing information display module is configured to preset an area in a display image of the currently-played video, and place the pushing information on the display image of the currently-played video for displaying.

In the terminal provided in this embodiment, after a key frame of a currently-played video is acquired, an characteristic value of the key frame is acquired according to picture information of the key frame, and the characteristic value of the key frame is uploaded to a server, so that the server acquires pushing information corresponding to the characteristic value of the key frame; after the pushing information returned by the server is received, the pushing information is displayed in a process of playing the currently-played video. Because the pushing information is acquired based on the key frame of the currently-played video, relevancy between the pushing information and the currently-played video is high, information pushing accuracy is greatly improved, and instantaneity of information pushing is better.

Figure 13:
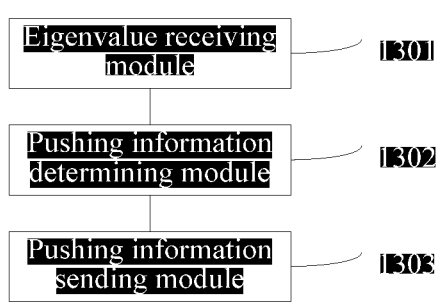
FIG. 13 is a schematic structural diagram of a server according to another embodiment of the present invention.

FIG. 13 shows a server according to an embodiment of the present invention. Referring to FIG. 13, the server includes an characteristic value receiving module 1301, a pushing information determining module 1302, and a pushing information sending module 1303, where the characteristic value receiving module 1301 is configured to receive an characteristic value, uploaded by a terminal, of a key frame; the pushing information determining module 1302 is connected to the characteristic value receiving module 1301 and is configured to determine pushing information according to the characteristic value of the key frame and an characteristic value of pre-stored each piece of to-be-pushed information; and the pushing information sending module 1303 is connected to the pushing information determining module 1302 and is configured to send the pushing information to the terminal.

In some embodiments, the pushing information determining module is configured to: for each piece of to-be-pushed information in pre-stored multiple pieces of to-be-pushed information, determine whether the number of data bits, different from data bits in the characteristic value of the key frame, in an characteristic value of the to-be-pushed information is less than a first preset value; and if the number of the data bits, different from the data bits in the characteristic value of the key frame, in the characteristic value of the to-be-pushed information is less than the first preset value, determine the to-be-pushed information as the pushing information; or, for each piece of to-be-pushed information in pre-stored multiple pieces of to-be-pushed information, determine whether a percentage accounted for by data bits, different from data bits in the characteristic value of the key frame, in an characteristic value of the to-be-pushed information is less than a second preset value;

and if the percentage accounted for by the data bits, different from the data bits in the characteristic value of the key frame, in the characteristic value of the to-be-pushed information is less than the second preset value, determine the to-be-pushed information as the pushing information.

In some embodiments, the server further includes:
a size zooming out module, configured to: for each piece of to-be-pushed information in the pre-stored multiple pieces of to-be-pushed information, zoom out the to-be-pushed information, to obtain a first processed picture;
a color simplification module, configured to perform color simplification processing on the first processed picture, to obtain a second processed picture; and
an characteristic value acquisition module, configured to acquire the characteristic value of the to-be-pushed information according to picture information of the second processed picture.

In some embodiments, the size zooming out module is configured to zoom out the to-be-pushed information according to a first preset size, and use a picture after zoom out as the first processed picture; or, select a key block, having a size being a second preset size, in the to-be-pushed information, and use the key block as the first processed picture.

In some embodiments, the characteristic value acquisition module is configured to calculate a grayscale value of each pixel point in the second processed picture; calculate an average grayscale value of all pixel points in the second processed picture; compare the grayscale value of each pixel point with the average grayscale value, to obtain multiple comparison results; and obtain the characteristic value of the to-be-pushed information according to the multiple comparison results.

In the server provided in this embodiment, after an characteristic value, uploaded by a terminal, of a key frame is received, pushing information is determined according to the characteristic value of the key frame and an characteristic value of pre-stored each piece of to-be-pushed information, and the pushing information is sent to the terminal. Because the pushing information is acquired based on the key frame of the currently-played video, relevancy between the pushing information and the currently-played video is high, information pushing accuracy is greatly improved, and instantaneity of information pushing is better.

The sequence numbers of the foregoing embodiments of the present invention are merely for the convenience of description, and do not imply the preference among the embodiments.

A person of ordinary skill in the art may understand that all or a part of the steps of the foregoing embodiments may be implemented by using hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention shall fall within the protection scope of the present invention.

What is claimed is:

1. An information pushing method, comprising:
   acquiring, by a terminal, a key frame of a currently-played video;
   acquiring, by the terminal, a characteristic value of the key frame according to picture information of the key frame, wherein the characteristic value of the key frame is an integer comprising a plurality of first data bits that are different bits of two hash values;
   acquiring, by a server according to the characteristic value of the key frame, pushing information corresponding to the characteristic value, wherein the acquiring, according to the characteristic value of the key frame, pushing information corresponding to the characteristic value comprises:
   determining, for each piece of to-be-pushed information in pre-stored multiple pieces of to-be-pushed information, whether a quantity of second data bits comprised in a characteristic value of the to-be-pushed information is less than a first preset value, wherein each of the second data bits has a different value from a corresponding first data bit comprised in the characteristic value of the key frame, and
   if the quantity of the second data bits is less than the first preset value, determining the to-be-pushed information as the pushing information; or,
   determining, for each piece of to-be-pushed information in the pre-stored multiple pieces of to-be-pushed information, whether a percentage accounted for by the second data bits in the characteristic value of the to-be-pushed information is less than a second preset value, and
   if the percentage accounted for by the second data bits is less than the second preset value, determining the to-be-pushed information as the pushing information; and
   displaying, by the terminal, the pushing information in a process of playing the currently-played video,
   wherein the acquiring a characteristic value of the key frame according to picture information of the key frame comprises:
   zooming out the key frame, to obtain a first processed picture;
   performing color simplification processing on the first processed picture, to obtain a second processed picture;
   calculating a grayscale value of each pixel point in the second processed picture;
   calculating an average grayscale value of all pixel points in the second processed picture;
   comparing the grayscale value of each pixel point with the average grayscale value, to obtain multiple comparison results; and
   obtaining the characteristic value of the key frame according to the multiple comparison results, and
   wherein the characteristic value of the to-be-pushed information is acquired in a same manner as the characteristic value of the key frame.

2. The method according to claim 1, wherein the acquiring a key frame of a currently-played video comprises:
   acquiring a first frame of the currently-played video, and using the first frame as the key frame of the currently-played video; or,
   acquiring a currently-played frame of the currently-played video, and using the currently-played frame as the key frame of the currently-played video; or,
   acquiring a video cover frame of the currently-played video, and using the video cover frame as the key frame of the currently-played video.

3. The method according to claim 1, further comprising:
   performing the step of acquiring a key frame of a currently-played video when a playback pause instruction for the currently-played video is detected in the process of playing the currently-played video; or,
   performing the step of acquiring a key frame of a currently-played video when a playback instruction for the currently-played video is detected, and performing the step of displaying the pushing information according to the pre-acquired pushing information when a playback pause instruction for the currently-played video is detected in the process of playing the currently-played video.

4. The method according to claim 1, wherein the zooming out the key frame, to obtain a first processed picture comprises:
   zooming out the key frame according to a first preset size, and using a picture after zoom out as the first processed picture; or,
   selecting a key block, having a size being a second preset size, in the key frame, and using the key block as the first processed picture.

5. The method according to claim 4, wherein the selecting a key block, having a size being a second preset size, in the key frame comprises:
   using a block, satisfying the second preset size and having a color change conforming to a preset regularity, in the first processed picture as the key block; or,
   using a block, comprising human face data and satisfying the second preset size, in the first processed picture as the key block; or,
   using a block, comprising a key word and satisfying the second preset size, in the first processed picture as the key block.

6. The method according to claim 1, wherein the displaying the pushing information comprises:
   presetting an area in a display image of the currently-played video, and placing the pushing information on the display image of the currently-played video for displaying.

7. A terminal, comprising: at least one processor and a memory having processor-executable instructions stored therein, and the instructions when executed by the at least one processor, configure the terminal to:

acquire a key frame of a currently-played video;

acquire a characteristic value of the key frame according to picture information of the key frame, wherein the characteristic value of the key frame is an integer comprising a plurality of first data bits that are different bits of two hash values;

upload the characteristic value of the key frame to a server, so that the server acquires pushing information corresponding to the characteristic value of the key frame, wherein the acquiring, according to the characteristic value of the key frame, pushing information corresponding to the characteristic value comprises:

determining, for each piece of to-be-pushed information in pre-stored multiple pieces of to-be-pushed information, whether a quantity of second data bits comprised in a characteristic value of the to-be-pushed information is less than a first preset value, wherein each of the second data bits has a different value from a corresponding first data bit comprised in the characteristic value of the key frame, and if the quantity of the second data bits is less than the first preset value, determining the to-be-pushed information as the pushing information; or, determining, for each piece of to-be-pushed information in the pre-stored multiple pieces of to-be-pushed information, whether a percentage accounted for by the second data bits in the characteristic value of the to-be-pushed information is less than a second preset value, and if the percentage accounted for by the second data bits is less than the second preset value, determining the to-be-pushed information as the pushing information;

receive the pushing information returned by the server; and display the pushing information in a process of playing the currently-played video, wherein the characteristic value of the key frame is acquired by:

zooming out the key frame, to obtain a first processed picture;

performing color simplification processing on the first processed picture, to obtain a second processed picture;

calculating a grayscale value of each pixel point in the second processed picture;

calculating an average grayscale value of all pixel points in the second processed picture;

comparing the grayscale value of each pixel point with the average grayscale value, to obtain multiple comparison results; and obtaining the characteristic value of the key frame according to the multiple comparison results, and wherein the characteristic value of the to-be-pushed information is acquired in a same manner as the characteristic value of the key frame.

8. The terminal according to claim 7, wherein the terminal is configured to acquire a first frame of the currently-played video, and use the first frame as the key frame of the currently-played video; or, acquire a currently-played frame of the currently-played video, and use the currently-played frame as the key frame of the currently-played video; or, acquire a video cover frame of the currently-played video, and use the video cover frame as the key frame of the currently-played video.

9. The terminal according to claim 7, wherein the terminal is configured to preset an area in a display image of the currently-played video, and place the pushing information on the display image of the currently-played video for displaying.

10. A server, comprising:

at least one processor and a memory having processor-executable instructions stored therein, and the instructions when executed by the at least one processor, configure the server to:

receive a characteristic value, uploaded by a terminal, of a key frame, wherein the characteristic value of the key frame is an integer comprising a plurality of first data bits that are different bits of two hash values;

determine pushing information according to the characteristic value of the key frame and a characteristic value of pre-stored each piece of to-be-pushed information, which comprises:

determining, for each piece of to-be-pushed information in pre-stored multiple pieces of to-be-pushed information, whether a quantity of second data bits comprised in a characteristic value of the to-be-pushed information is less than a first preset value, wherein each of the second data bits has a different value from a corresponding first data bit comprised in the characteristic value of the key frame, and if the quantity of the second data bits is less than the first preset value, determining the to-be-pushed information as the pushing information; or, determining, for each piece of to-be-pushed information in the pre-stored multiple pieces of to-be-pushed information, whether a percentage accounted for by the second data bits in the characteristic value of the to-be-pushed information is less than a second preset value, and if the percentage accounted for by the second data bits is less than the second preset value, determining the to-be-pushed information as the pushing information; and send the pushing information to the terminal, wherein the server is further configured to:

for each piece of to-be-pushed information in the pre-stored multiple pieces of to-be-pushed information, zoom out the to-be-pushed information, to obtain a first processed picture;

perform color simplification processing on the first processed picture, to obtain a second processed picture;

calculating a grayscale value of each pixel point in the second processed picture;

calculating an average grayscale value of all pixel points in the second processed picture;

comparing the grayscale value of each pixel point with the average grayscale value, to obtain multiple comparison results; and obtaining the characteristic value of the key frame according to the multiple comparison results, and wherein the characteristic value of the to-be-pushed information is acquired in a same manner as the characteristic value of the key frame.

11. The server according to claim 10, wherein the server is configured to zoom out the to-be-pushed information according to a first preset size, and use a picture after zoom out as the first processed picture; or, select a key block, having a size being a second preset size, in the to-be-pushed information, and use the key block as the first processed picture.

12. The server according to claim 10, wherein the server is configured to calculate a grayscale value of each pixel point in the second processed picture; calculate an average grayscale value of all pixel points in the second processed picture; compare the grayscale value of each pixel point with the average grayscale value, to obtain multiple comparison results; and obtain the characteristic value of the to-be-pushed information according to the multiple comparison results.

13. The method according to claim 1, wherein the two hash values are a hash value calculated by a perceptual hash algorithm and a hash value calculated by a pHash/SIFT algorithm.

14. The method according to claim 1, wherein the key frame is acquired when a playback instruction for the currently-played video is detected, and the pushing information is displayed when a playback pause instruction for the currently-played video is detected in the process of playing the currently-played video.

* * * * *